Sept. 20, 1960 R. L. MEADOWS 2,953,396
TRACTOR AND LOW-BED TRAILER COUPLING
Filed Dec. 29, 1958 5 Sheets-Sheet 1
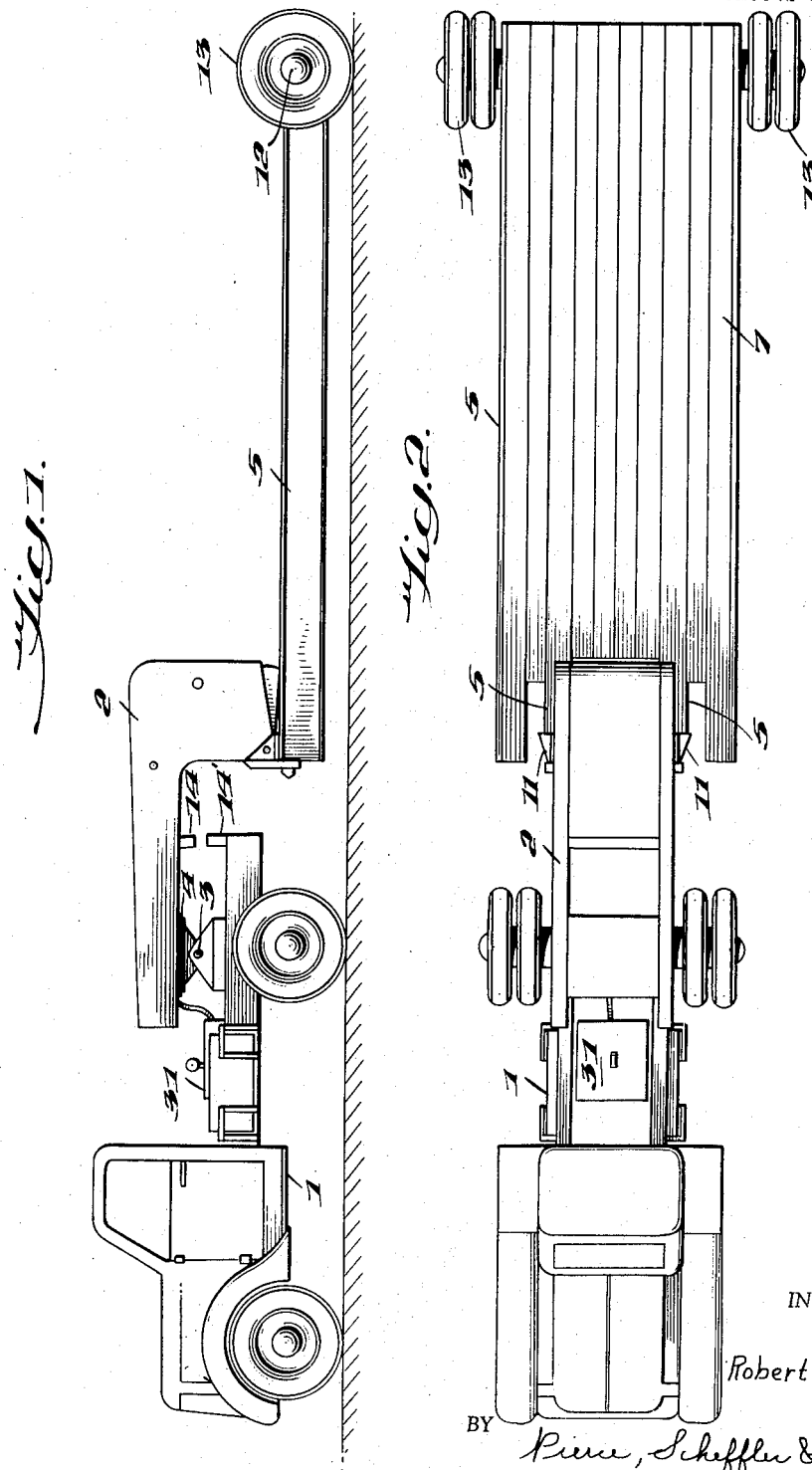
INVENTOR
Robert L. Meadows
BY
Pierce, Scheffler & Parker
ATTORNEYS

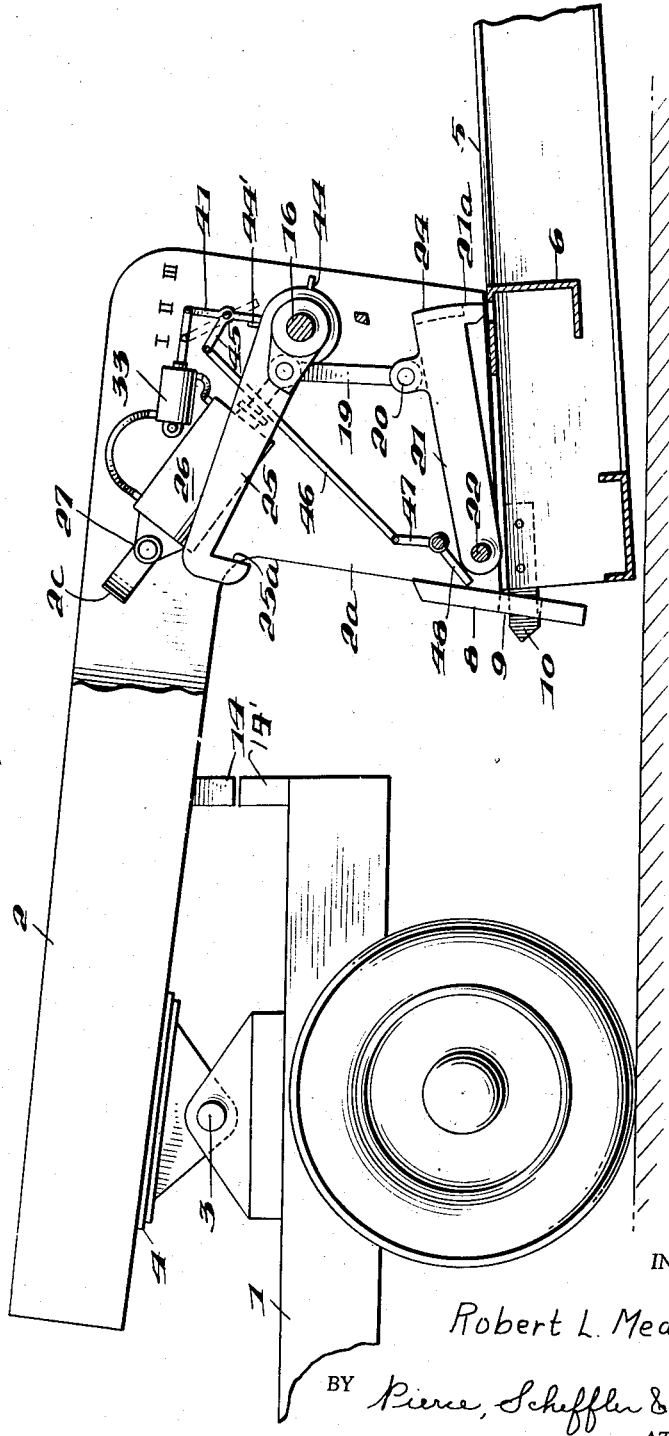

Sept. 20, 1960 R. L. MEADOWS 2,953,396
TRACTOR AND LOW-BED TRAILER COUPLING
Filed Dec. 29, 1958 5 Sheets-Sheet 3
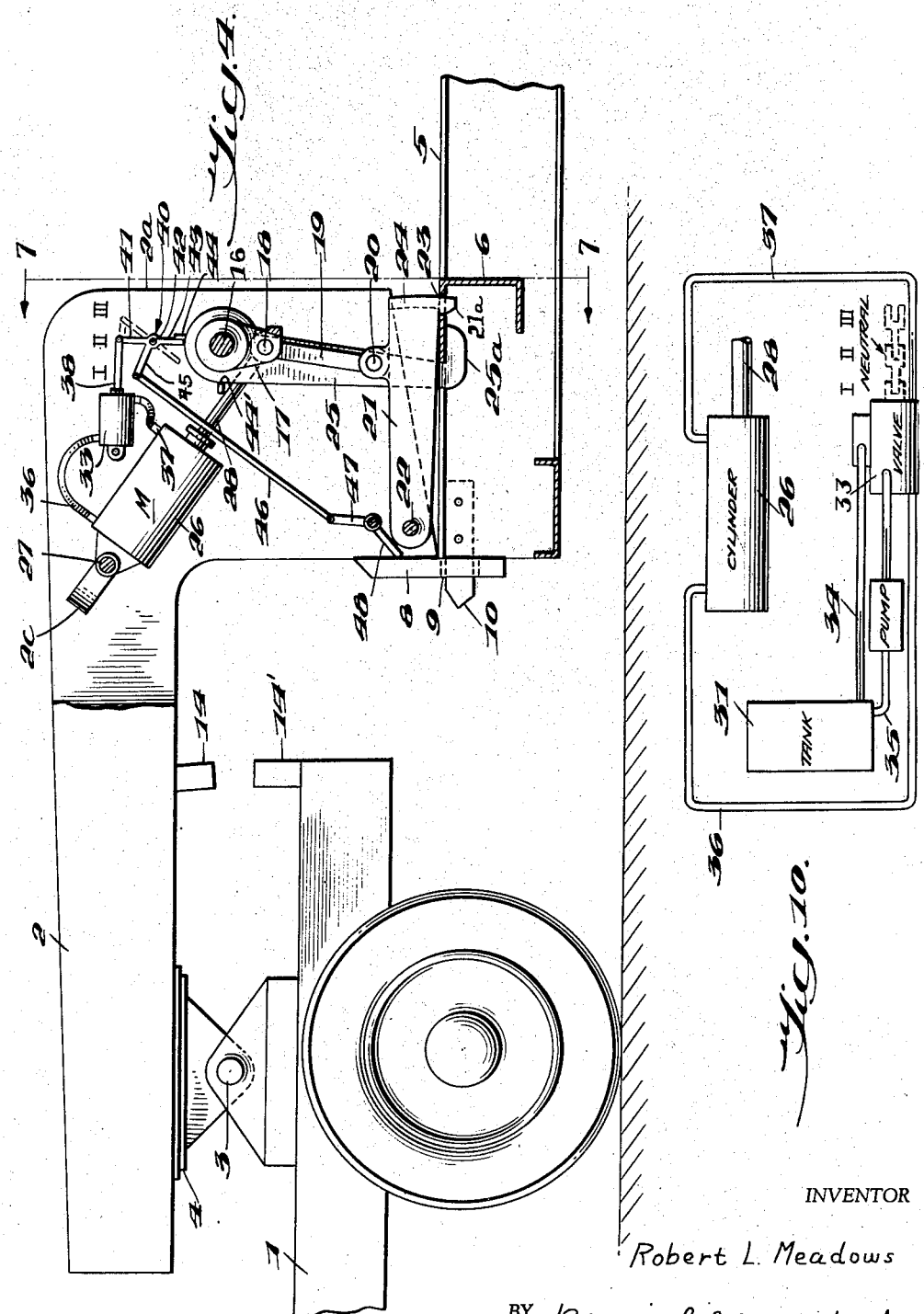
INVENTOR
Robert L. Meadows
BY Pierce, Scheffler & Parker
ATTORNEYS Sept. 20, 1960  R. L. MEADOWS  2,953,396
TRACTOR AND LOW-BED TRAILER COUPLING
Filed Dec. 29, 1958  5 Sheets-Sheet 4
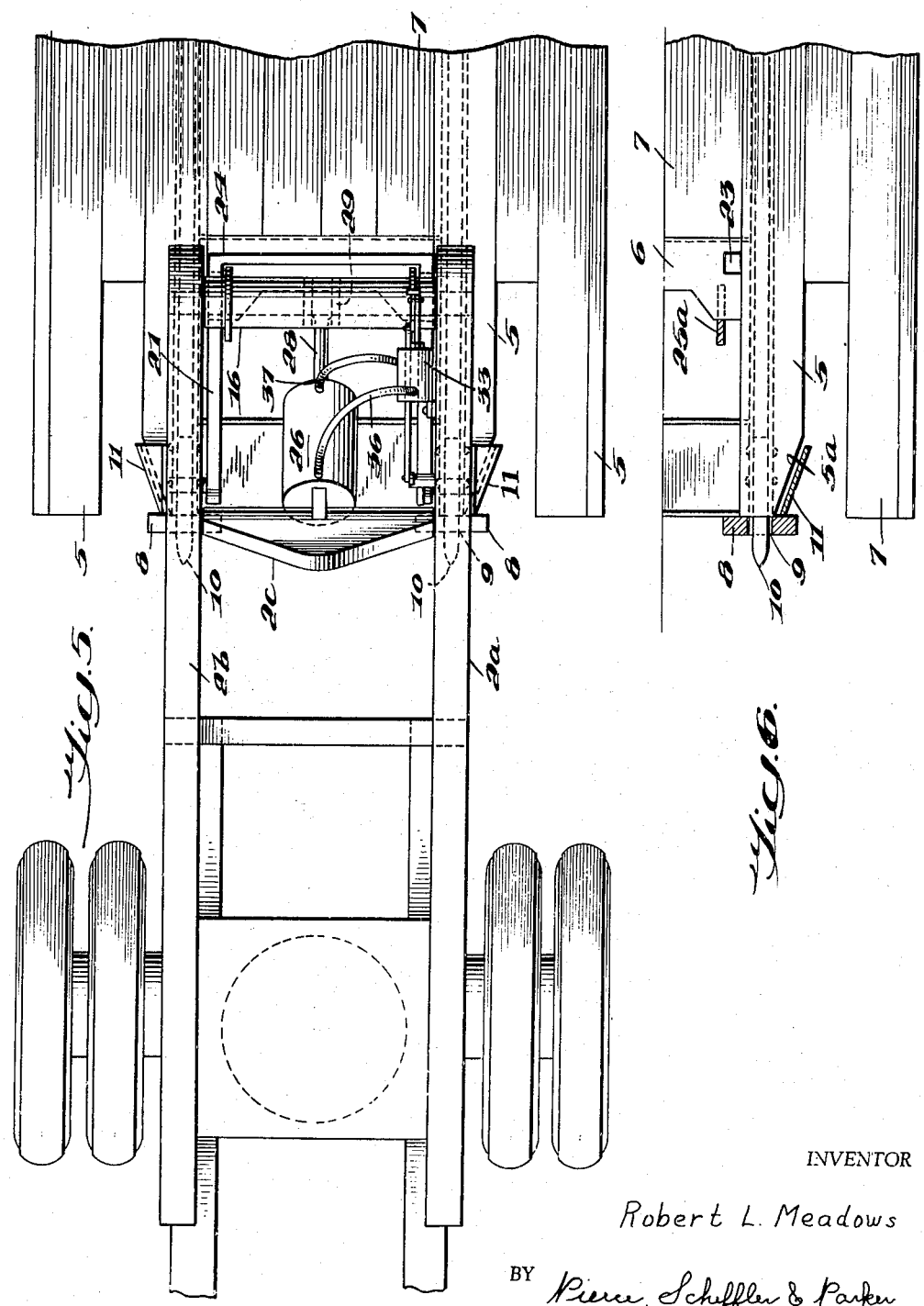
INVENTOR
Robert L. Meadows
BY Pierce, Scheffler & Parker
ATTORNEYS Sept. 20, 1960     R. L. MEADOWS     2,953,396
TRACTOR AND LOW-BED TRAILER COUPLING
Filed Dec. 29, 1958     5 Sheets-Sheet 5
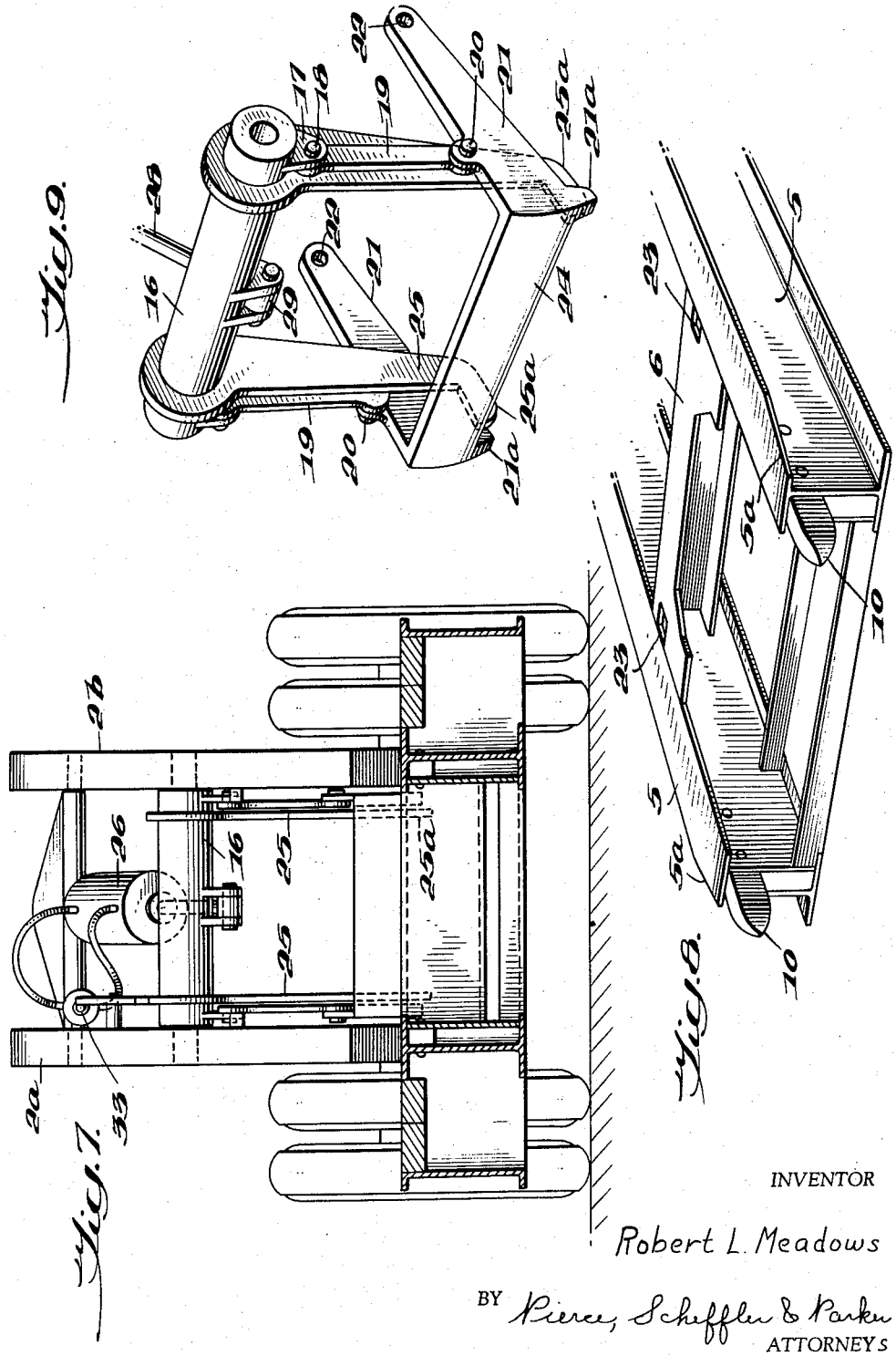
INVENTOR
Robert L. Meadows
BY *Pierce, Scheffler & Parker*
ATTORNEYS

United States Patent Office 2,953,396
Patented Sept. 20, 1960

2,953,396
TRACTOR AND LOW-BED TRAILER COUPLING

Robert L. Meadows, 1424 N. Wayne St., Arlington, Va.

Filed Dec. 29, 1958, Ser. No. 783,236

8 Claims. (Cl. 280—423)

The present invention relates to tractor-trailer units and in particular to tractors which are provided at the rear end thereof with a gooseneck which is adapted to be coupled to the front end of a trailer of the so-called "low-bed" type and which is commonly used for hauling heavy self-propelled machinery such as shovels, caterpillar tractors, road rollers, etc. from one construction job to another. The trailer unit is provided with one or more wheeled axles at its rear end only, and is loaded or unloaded by lowering the front end to the ground and providing ramps or skid boards at such end to enable the machinery to move from the ground onto the trailer platform or vice versa. Front end loading of the trailer unit is preferred because of the maximum stability provided as compared with ramp loading from the rear end over the wheeled axle.

To enable the trailer unit to be loaded or unloaded from the front end it is, of course, necessary to provide some means for coupling and uncoupling the gooseneck with respect to the front end of the trailer and also some means for raising and lowering the front end of the trailer so that the latter may be shifted between its raised traveling position and its lowered position resting upon the ground which is used for loading and unloading.

The present invention has for its object an improved arrangement for coupling the gooseneck relative to the front end of the trailer unit and for raising and lowering the front end of the trailer unit.

A more specific object is to provide a raising and lowering mechanism for the front end of a low-bed trailer comprising a gooseneck which is mounted for pivotal movement in a vertical plane about a horizontal pivot bearing carried by a tractor or towing unit, coupling means interconnecting the gooseneck and front end of the trailer, a rock shaft mounted horizontally and transverse on the gooseneck, lever means pivotally mounted on the lower portion of the gooseneck for vertical movement, the levers having toe portions engageable in correspondingly located apertures in the trailer, driving linkage interconnecting driver arms on the rock shaft with the levers and power actuated means such as a hydraulic cylinder pivotally mounted in the gooseneck for rotating the rock shaft about its axis thereby to actuate the levers downwardly or upwardly, as the case may be to thus raise and lower, respectively the front end of the trailer, the lifting force being developed by application of pressure from the lower edge of the levers, at a point rearward from their pivot mounting, downwardly against the trailer along pressure points located rearwardly from the coupling means which interconnects the gooseneck with the front end of the trailer.

A further feature of the mechanism described above resides in the use of locking arms rotatable by the rock shaft which automatically engage the trailer as the latter is lifted into the position for transport thus preventing any accidental rotation of the rock shaft into the lowering position while the trailer is being towed. Accidental rotation of the rock shaft is also minimized through the use of an over-center or toggle mechanism in the driver linkage connecting the rock shaft with the levers which apply the lifting force.

The foregoing as well as other objects and advantages inherent in the invention will become more apparent from the following description of a preferred embodiment thereof when considered with the accompanying drawings which illustrate the same. In these drawings:

Fig. 1 is a view in side elevation showing the tractor coupled by way of the gooseneck to the low bed trailer unit and with the latter in the raised position used for hauling the trailer unit and the load which it carries.

Fig. 2 is a view in top plan of the coupled tractor and trailer unit.

Fig. 3 is a view in longitudinal vertical section drawn to a somewhat larger scale than is Fig. 1 showing the gooseneck and front end portion of the trailer unit and with the parts illustrated in the positions which they occupy just after the tractor has been backed into coupling position with the front end of the trailer unit.

Fig. 4 is a view similar to Fig. 3 but showing the positions of the parts after the hydraulic motor housed in the gooseneck has been actuated to raise the front portion of the trailer to its generally horizontal, traveling position.

Fig. 5 is a fragmentary top plan view showing the gooseneck and front end of the trailer unit in the same positions as illustrated in Fig. 3.

Fig. 6 is a top plan view of a portion of the front end of the trailer.

Fig. 7 is a view in vertical transverse section on line 7—7 of Fig. 4.

Fig. 8 is a view in perspective of the front end portion of the trailer unit frame, the flooring being removed.

Fig. 9 is also a view in perspective showing the hydraulically actuated mechanism by which the trailer unit is lowered and raised between its loading and traveling positions, respectively.

Fig. 10 is a view showing the hydraulic system used for supplying pressure fluid to the double acting hydraulic cylinder which acts as the power source for actuating the raising and lowering mechanism for the trailer unit.

With reference now to the drawings and in particular to Figs. 1 and 2, it will be seen that the so-called tractor unit consists essentially of a conventional internal combustion engine powered truck 1 provided at its rear end with a gooseneck 2 mounted for pivotal movement in a vertical plane about a horizontal shaft 3. The gooseneck is also arranged for swinging movement in a horizontal plane by means of a conventional fifth wheel unit 4.

The trailer unit is of the low-bed type and consists essentially, as shown in Fig. 8, of an elongated rectangular frame 5 made up from structural steel beams 5 such as H-beams or the like and which is reinforced by one or more transversely extending beams 6. The steel frame is covered by any suitable flooring material such as longitudinally extending planking 7 to establish a platform.

Depending at each side of the gooseneck 2 is a plate 8 having an aperture 9 through the same. The plates 8 are secured rigidly to the gooseneck such as by welding and are in such position relative to the trailer unit as to cause the apertures 9 to become engaged with pins 10 which project forwardly from the front ends of the longitudinal beams 5 when the tractor unit is backed up to the front end of the trailer unit.

In order to assist in properly aligning the plate apertures 9 with the coupling pins 10, it will be seen that outwardly flared guide plates 11 are provided at each side of the gooseneck. These guide plates 11 are adapted to engage angled-off portions 5a of the top plates of the longitudinal trailer beams 5 as the gooseneck 2 moves rearward and hence effect the proper and necessary longitudinal alignment between the gooseneck 2 and the trailer so that the pins 10 on the trailer enter the apertures 9 in plates 8 as the tractor 1 is backed into coupling position.

The running gear for the trailer consists of one rear axle 12 with dual tires 13 at each end of the axle. However, the running gear illustrated at the rear of the trailer unit is of no particular significance and can be departed from in various respects as desired.

As is evident from the drawings, the front end of the trailer unit has no running gear associated with it but rather is arranged to rest upon the ground in a downwardly inclined attitude for loading and unloading as shown in Fig. 3. A pair of stop members 14, 14', one on the tractor and the other at the underside of the gooseneck serves to limit downward movement of the latter to the Fig. 3 position. When the tractor and trailer unit are uncoupled and the tractor moved forward, a ramp or skid boards (not shown) can be fitted to the front end of the trailer unit in the customary manner for front-end loading or unloading of equipment.

For transport, the front end of the trailer unit is raised to the position illustrated in Fig. 4, in which position it is interlocked with the tractor unit. When the front end of the trailer unit is lowered to the Fig. 3 position, it is also automatically unlocked with respect to the tractor unit thus enabling the latter to be driven away.

As explained at the outset of the description, the principal object of the present invention is to provide a new and improved mechanism for raising and lowering the front end of the trailer unit. This mechanism comprises a transverse rock shaft 16 which extends horizontally between the side plates 2a, 2b of the gooseneck and is mounted in suitable bearing structure on these plates for rotation about its longitudinal axis. Carried on rock shaft 16 in longitudinally spaced relation are a pair of rocker arms 17 which are articulated at 18 to the upper ends of a pair of downwardly extending driver links 19. The lower ends of these links 19 are articulated at 20 to the rearward portions of levers 21 which are pivotally mounted at 22 at their front ends to the corresponding side plates 2a, 2b of the gooseneck and adjacent the lower edge thereof. The rear end of each lever 21 is provided with a downwardly extending toe 21a which is adapted to enter a correspondingly aligned aperture 23 provided in the top plate portion of the front transverse reinforcing cross beam 6 of the trailer. It will be seen from Fig. 4 that when the lever toes 21a are entered into the aperture 23, the gooseneck 2 and front end of the trailer are securely interlocked thus enabling the tractor to apply the necessary towing force to the trailer.

The rearward ends of the levers 21 are bridged by a transverse plate 24, the lower edge of which is adapted along with the rear ends of levers 21 to bear downwardly against the top plate of cross beam 6.

Also carried in spaced relation on the rock shaft 16 are a pair of locking arms 25 which are located inwardly of the rocker arms 17. The lower end of each of these locking arms 25 terminates in a rearwardly projecting toe portion 25a adapted to engage with the underface of the top plate of the transverse beam 6 as shown in Figs. 4 and 6. The purpose of the locking arms 25 is to minimize the danger of accidentally dropping the front end of the trailer unit during transport.

For rotating the rock shaft 16 from the position shown in Fig. 3 to the position shown in Fig. 4 and vice versa, a double-acting hydraulic motor M is used. This motor consists of a cylinder 26 having its rear end pivotally mounted at 27 upon a transverse member 2c which extends between the side plates 2a, 2b of the gooseneck. The piston rod 28 extends to and is articulated with another rocker arm 29 on rock shaft 16 at the middle of the latter and hence intermediate the locking arms 25 and rocker arms 17.

The control mechanism for actuating the hydraulic motor M is shown in Fig. 10. Here it will be seen that a tank 31 containing the hydraulic fluid is provided as is also a hydraulic pump 32 and a control valve 33 of the well known continuous flow type. The tank 31, pump 32 and valve 33 are connected in a series circuit by means of the hoses 34 and 35. Control valve 33 is connected by means of hoses 36, 37 with the opposite ends of the hydraulic cylinder 26. Tank 31 and pump 32 are mounted on the tractor 1 and pump 32 can be driven by any suitable power take-off from the motor, or a separate motor drive for the pump can be used. The valve control rod 38 shown in Fig. 10 has three positions designated I, II and III. Position II shown in full lines is the neutral position wherein fluid under pressure is applied to neither end of the hydraulic cylinder 26. When the control rod 38 is shifted to position I, fluid under pressure from pump 32 is delivered through valve 33 and hose 36 to the left end of cylinder 26 and is returned from the right end of this cylinder through hose 37, valve 33 and hose 34 to the tank thus driving the piston rod 28 out of the cylinder 26 to the position shown in Fig. 4. When control rod 38 is shifted to position III, fluid under pressure from pump 32 is delivered through valve 33 and hose 37 to the right end of cylinder 26 and is returned from the left end of this cylinder through hose 36, valve 32 and hose 34 to tank 31, thus driving piston rod 28 into the cylinder 26 to the position shown in Fig. 3.

For actuating the valve control rod 38, a system of links and levers is utilized and these are mounted at the inner face of side plate 2a of the gooseneck as shown in Figs. 3, 4 and 7. In detail, valve control rod 38 is articulated to one arm 41 of a lever 40 pivotally mounted at 42. Another arm 43 of this lever projects downwardly into the path of a pair of lugs 44, 44' located on the rock shaft and spaced about 90° apart around the shaft. The purpose of lugs 44, 44' is to return the valve control rod 38 from position I or III to the neutral position II when the piston rod 28 reaches the end of its stroke at either end of the cylinder 26. Articulated to still a third arm 45 of this lever is one end of a link 46 which extends downwardly and is articulated at its opposite lower end to a manually operable, pivotally mounted lever 47 with an actuating handle 48.

The mechanism for raising and lowering the front end of the trailer unit operates in the following manner.

With reference to Fig. 3 which shows the trailer unit in position to be raised, handle 48 is pushed downwardly to rotate lever 47 counterclockwise and pull link 46 downwardly. This effects counterclockwise rotation of lever 40 and moves the valve control rod 38 from the neutral position II to position I. As previously explained, this causes piston rod 28 to be driven out of cylinder 26 and effects counterclockwise rotation of rock shaft 16 and locking arms 25 to the position shown in Fig. 4 wherein the toes 25a of the arms 25 engage the lower face of the top flange of the transverse bracing beam 6. Counterclockwise rotation of rock shaft 16 also exerts a downward driving force on driver links 19 which, in turn, apply a downward moment to levers 21 driving the toe portions 21a into the apertures 23 and causing the outer ends of levers 21 and the lower edge of the bridging member 24 to bear against the top flange of the transverse beam 6. The ensuing reaction force developed by application of the above mentioned forces causes the front end of the trailer unit to rise to the position shown in Fig. 4. It will be noticed from this view that the centers of rock shaft 16 and pivots 18 and 20 do not lie along a straight line but rather the pivot connection 18 for rocker arm 17 and driver link 19 is slightly "over-center," thus forming a toggle which tends to lock the parts in the raised position during transport. The locking arms 25 also serve this same general purpose. It will also be noted from Fig. 4 that the lug 44 on rock shaft 16 has engaged and actuated the lower arm 43 of lever 40 thus shifting the valve control rod 38 back from position I to the neutral position II.

To lower the trailer unit to the ground from the position shown in Fig. 4, handle 48 is rotated clockwise, pushing link 46 upward and rotating lever 40 clockwise thus drawing valve control rod 38 outward from position II to position III. This causes piston rod 28 to be drawn into cylinder 26 thus breaking the toggle joint and rotating rock shaft 16 and the arms thereon clockwise to the positions shown in Fig. 3. As the levers 21 rise, the front end of the trailer unit lowers simultaneously. The toes 21a release from the apertures 23 and the tractor unit can then be pulled forward and released from the trailer unit.

In conclusion it is to be understood that while the foregoing description and drawings have presented one practical embodiment of the invention, various modifications may be made with respect to the specific structural components and their arrangement without, however, departing from the spirit and scope of the invention as defined in the appended claims.

I claim:

1. Apparatus for coupling a tractor with a trailer and for raising and lowering the front end of said trailer between a hauling and loading position respectively comprising a gooseneck mounted upon and extending rearwardly from said tractor, said gooseneck being arranged for pivotal movement about a horizontal axis in a vertical plane, complementary engageable coupling means on said gooseneck and the front end of said trailer for interconnecting the same, lever means pivotally mounted on the lower portion of said gooseneck for movement in a vertical plane parallel with the plane of movement of said gooseneck, a horizontal rock shaft mounted transversely in said gooseneck above said lever means parallel with the pivot axis of said gooseneck, means pivotally connecting a rocker arm on said rock shaft with said lever means at a point rearward of the pivot axis for said lever means, and means for rotating said rock shaft to apply a downward moment to said lever means and application of a downward force by said lever means against said trailer at a point rearward from said coupling means thereby causing the front end of said trailer to raise and said gooseneck to move upwardly about its pivot axis.

2. Apparatus as defined in claim 1 and wherein said lever means are provided with toe portions enterable into aligned apertures in said trailer upon downward movement of said lever means to establish a towing connection between said tractor and trailer.

3. Apparatus as defined in claim 1 wherein said means for rotating said rock shaft comprises a hydraulic motor, the cylinder of said motor being pivotally mounted within said gooseneck and the piston rod of said motor being articulated to a rocker arm on said rock shaft.

4. Apparatus as defined in claim 1 wherein said lever means comprises a lever at each side of said gooseneck.

5. Apparatus as defined in claim 4 wherein said levers include toe portions enterable into aligned apertures in said trailer upon downward movement of said levers to establish a towing connection between said tractor and trailer.

6. Apparatus as defined in claim 1 wherein said means pivotally connecting said rocker arm on said rock shaft with said lever means comprise a driver link articulated to the rocker arm and lever means respectively.

7. Apparatus as defined in claim 6 wherein the points of articulation between said driver link and said rocker arm and lever means respectively establish an over-center mechanism with respect to the axis of said rock shaft as the latter is rotated and said lever means are moved downwardly.

8. Apparatus for coupling a tractor with a trailer and for raising and lowering the front end of said trailer between a hauling and loading position respectively comprising a gooseneck mounted upon and extending rearwardly from said tractor, said gooseneck being arranged for pivotal movement about a horizontal axis in a vertical plane, complementary engageable coupling means on said gooseneck and the front end of said trailer for interconnecting the same, lever means pivotally mounted on the lower portion of said gooseneck for movement in a vertical plane parallel with the plane of movement of said gooseneck, said lever means being provided with toe portions enterable into aligned apertures in said trailer upon downward movement of said lever means to establish a towing connection between said tractor and trailer, power actuated means mounted on said gooseneck above and coupled to said lever means for applying a downward moment to said lever means and application of a downward force by said lever means against said trailer at a point rearward from said coupling means thereby causing the front end of said trailer to raise and said gooseneck to move upwardly about its pivot axis.

References Cited in the file of this patent

UNITED STATES PATENTS 2,545,584   Meadows _____ Mar. 20, 1954